(12) United States Patent
Kreuter et al.

(10) Patent No.: US 7,055,470 B2
(45) Date of Patent: Jun. 6, 2006

(54) INTERNAL COMBUSTION ENGINES HAVING DOUBLE CYLINDER UNITS

(75) Inventors: Peter Kreuter, Aachen (DE); Mathias von Essen, Alsdorf (DE)

(73) Assignee: Meta Motoren-und Energie-Technik GmbH, Herzogenrath (DE)

( * ) Notice: Subject to any disclaimer, the term of this patent is extended or adjusted under 35 U.S.C. 154(b) by 0 days.

(21) Appl. No.: 10/798,377

(22) Filed: Mar. 12, 2004

(65) Prior Publication Data

US 2004/0226523 A1 Nov. 18, 2004

(30) Foreign Application Priority Data

Mar. 14, 2003 (DE) ................. 103 11 358

(51) Int. Cl.
 *F02B 75/06* (2006.01)
(52) U.S. Cl. .................................. 123/51 A
(58) Field of Classification Search ............... 123/52.2, 123/52.3, 52.5, 51 A, 90.16, 90.27, 90.44, 123/51 BB, 51 R
 See application file for complete search history.

(56) References Cited

U.S. PATENT DOCUMENTS 2,706,970 A * 4/1955 Rinne ...................... 123/51 B
4,274,369 A * 6/1981 Rhoads ..................... 123/51 A
5,404,851 A 4/1995 Neitz et al.
6,668,779 B1 * 12/2003 Hendriksma et al. .... 123/90.44

FOREIGN PATENT DOCUMENTS

| DE | 490735 | 8/1930 |
|---|---|---|
| DE | 711136 | 9/1941 |
| DE | 1048738 | 1/1959 |
| DE | 2122523 | 11/1972 |
| DE | 4227927 A1 | 2/1994 |

OTHER PUBLICATIONS

English Translation of German Priority Document's Examination Report of Jan. 14, 2004.

* cited by examiner

*Primary Examiner*—Henry C. Yuen
*Assistant Examiner*—Hyder Ali
(74) *Attorney, Agent, or Firm*—Birch, Stewart, Kolasch & Birch, LLP

(57) ABSTRACT

An internal combustion engine may comprise at least one double cylinder (17). A piston (10, 12) is reciprocally movably disposed in each individual cylinder (14, 16) of the double cylinder and each piston is connected to a crankshaft (4). The pistons preferably reciprocate in the same direction within the individual cylinders. A cylinder space (19, 20) is defined within the cylinders above each piston head. Preferably, the cylinder spaces are formed such that the cylinder spaces communicate during at least a portion of the reciprocal movement of the pistons.

20 Claims, 8 Drawing Sheets

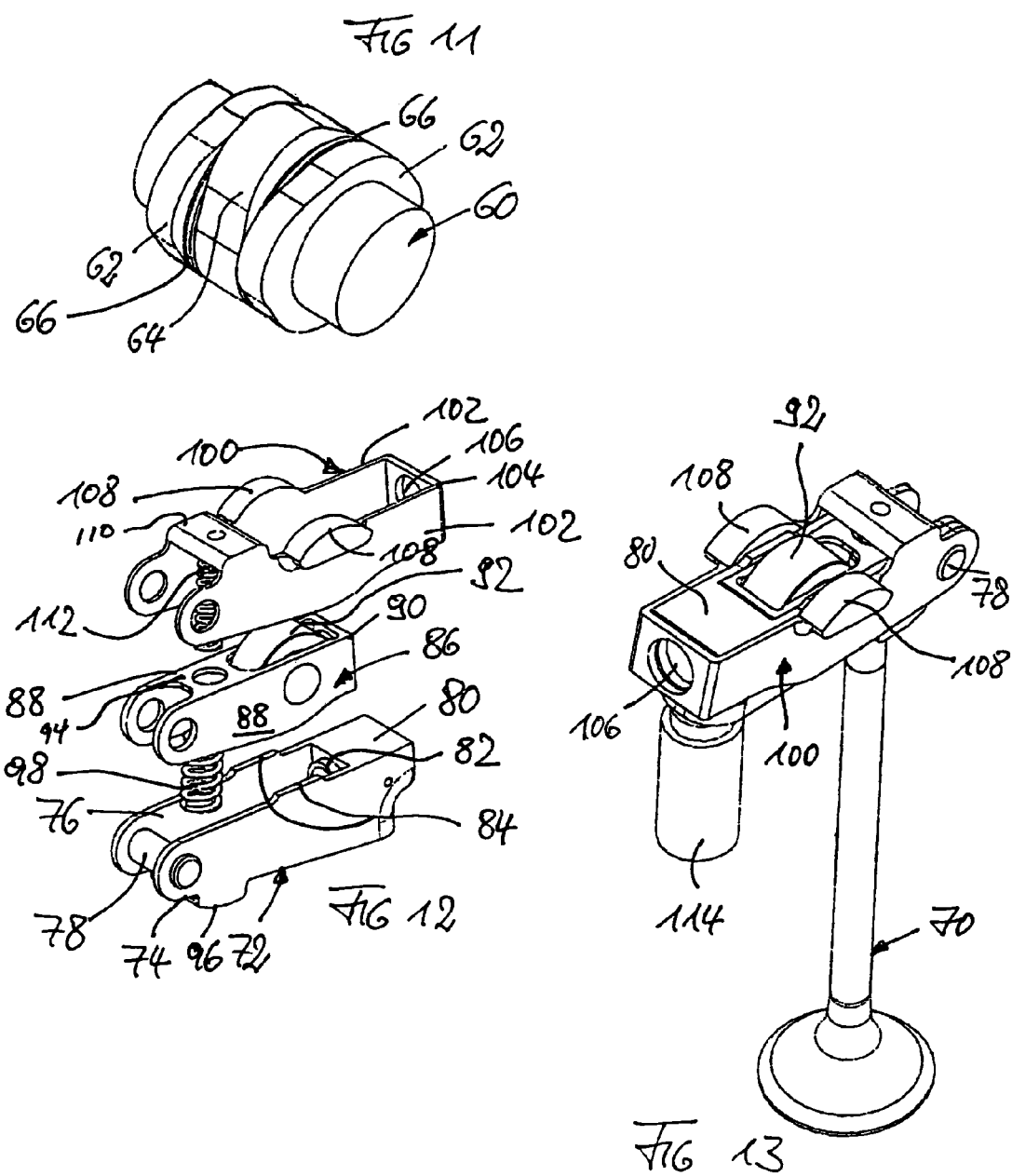

INTERNAL COMBUSTION ENGINES HAVING DOUBLE CYLINDER UNITS

CROSS-REFERENCE

This application claims priority to German patent application number 103 11 358.4 filed Mar. 14, 2003, the contents of which are incorporated by reference as if fully set forth herein.

TECHNICAL FIELD

The present invention relates to internal combustion engines having double cylinder/twin piston arrangements, in which at least two cylinders share and/or communicate via a common combustion chamber or a communication path during at least a portion of the reciprocating movement of the pistons. Methods for operating such internal combustion engines and apparatus for adjusting the valve stroke function of a charge change valve (i.e., an intake and/or outlet valve) are also provided.

THE RELATED ART

Generally speaking, internal combustion engines utilize one piston per cylinder. Each cylinder has its own combustion chamber and inlet and outlet (exhaust) valves. In other words, the combustion chambers and/or the intake and outlet valves are not shared by two or more cylinders.

German Laid-open Publication No. 2 122 523 and U.S. Pat. No. 2,022,094 describe internal combustion engines, in which two cylinders share a common combustion chamber. However, these designs suffer from inadequate performance.

SUMMARY OF THE INVENTION

It is, therefore, an object of the invention to teach combustion engines that can provide improved performance as compared to known designs.

According to one aspect of the present teachings, instead of conventional single cylinders, the internal combustion engine comprises one or more double cylinders. A piston reciprocates within each individual cylinder of the double cylinder. In addition, preferably the two pistons of one double cylinder reciprocate together, or reciprocate substantially together. Moreover, both pistons may be connected to a common crank, or split crank portions, of the crankshaft.

In addition, the respective cylinder spaces above each piston are capable of communicating with each other during at least a portion of the reciprocating movement of the pistons. Moreover, a common combustion chamber is preferably defined so as to communicate with the two cylinder spaces. The exchange of gases (e.g., fuel and/or air) within the combustion chamber can be controlled in various ways using valves and valve actuating devices. For example, at least one inlet valve may be disposed over one piston and at least one outlet valve may be disposed over the other piston.

Compared with conventional internal combustion engines, the present teachings provide engines that can operate with smaller pistons for the same displacement, thereby making possible higher engine speeds and correspondingly higher performance. Moreover, because each piston is not required to have its own inlet and outlet valves, the number of engine components can be reduced.

In other aspects of the present teachings, it can be advantageous for the two pistons of the double cylinder to reach their top dead center position at the same time, or at substantially the same time.

In other aspects of the present teachings, internal combustion engines may be operated in a two-stroke mode and/or optionally in a four stroke mode.

In other aspects of the present teachings, apparatus are taught for adjusting the valve stroke function of the charge change valve (e.g., the intake and/or exhaust valve(s)). Such apparatus may be capable of selectively changing operation of the engine between the two-stroke mode and the four-stroke mode.

Other advantageous embodiments of the present invention provide internal combustion engines that have reduced overall dimensions and a lesser number of components relative to the torque and performance of the engine, as compared to known designs.

Additional objects, features and advantages of the present teachings will be readily understood to a person of ordinary skill in the art after reading the following detailed description of examples and embodiments of the present teachings together with the claims and the accompanying drawings.

BRIEF DESCRIPTION OF THE DRAWINGS

FIG. 11 is a perspective view of a representative camshaft suitable for switching between two-stroke and four-stroke operation.

FIG. 12 is a perspective view of components of a representative valve actuating device, which is switchable between two-stroke and four-stroke operation.

FIG. 13 is a perspective overall view of the assembled valve actuating device of FIG. 12.

DETAILED DESCRIPTION OF THE INVENTION

Figure 1:
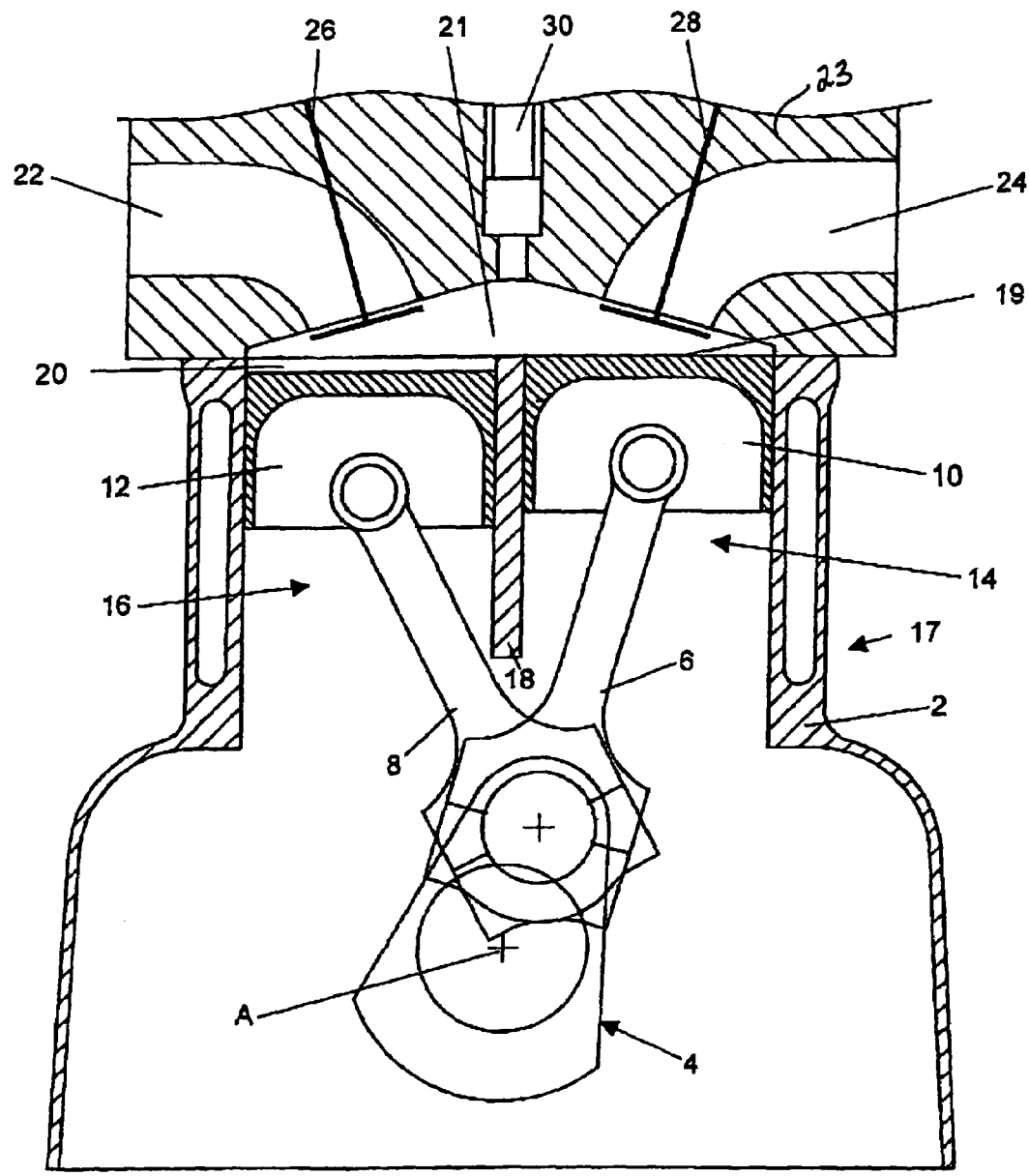
FIG. 1 is a cross-section, perpendicular to the axis of the crankshaft, through a twin-piston engine.

In one embodiment of the present teachings, internal combustion engines may include a crank drive that is rotatably disposed within an engine housing. Preferably, at least one double cylinder unit is defined within the engine housing. The one or more double cylinder units preferably comprise at least two individual cylinders, which may be separated by a common cylinder wall. One piston is reciprocally disposed within each individual cylinder. Further, each piston includes a piston head and the pistons are connected to the crank drive such the pistons reciprocate in the same direction within the individual cylinders. Further, a cylinder space is defined within each individual cylinder on the side of the piston head that is opposite of the crank drive. Moreover, a communication path is preferably provided for interconnecting the cylinder spaces of one double cylinder unit during at least a portion of the reciprocal movement of the pistons.

In one aspect of this embodiment, the crank drive is arranged and constructed such that the pistons are located at their top dead center position at the same time. For example, the crank drive may comprise a crankshaft with a crank having first and second crank pin portions. Each crank pin portion has a longitudinal axis and the respective longitudinal axes are preferably offset. One end of a connecting rod may be connected to the piston and another end of the connecting rod may be connected to one of the first and second crank pin portions. Optionally, the longitudinal axes of the crank pin sections are offset with respect to each other such that the connecting rods reach their extended position at the same time.

In an alternative aspect of this embodiment, the crank drive may include a crankshaft having a crank pin. A bridge member may be mounted on the crank pin. First and second connecting rods may be mounted on opposite sides of the bridge member relative to the crank pin. A guide device may retain the bridge member at least in the uppermost position of the crankpin relative to the movement paths of the such that the pistons are located in their dead center position at the same time.

In addition or in the alternative, the individual cylinders have respective longitudinal axes that are axially and radially offset with respect to each other relative to a rotational axis of the crank drive.

In addition or in the alternative, the individual cylinders have respective longitudinal axes that are axially and radially offset with respect to each other relative to a rotational axis of the crank drive.

In addition or in the alternative, the individual cylinders have longitudinal axes may be parallel to each other or may be at an angle to each other.

In addition or in the alternative, a common combustion chamber may be defined in a cylinder head for permitting (longitudinal) communication between the cylinder spaces. The common combustion chamber optionally may be defined as a recess that at least partially overlaps the cylinder spaces. Optionally, an injection valve may be disposed so as to open into the recess. Optionally, three inlet valves and three outlet valves may be disposed such that at least one inlet valve and at least one outlet valve opens into the common combustion chamber In addition or in the alternative, at least one slot may be defined in a common cylinder wall that separates the individual cylinders within the double cylinder unit. The slot preferably permits (longitudinal) communication between the cylinder spaces at least when the pistons are located in their bottom dead center position. At least two piston rings may be disposed around each piston and if so, the distance between the piston rings preferably is greater than the height of the at least one slot in the longitudinal direction of the cylinder. Optionally, the piston ring that is disposed closest to the crank drive may have the property of providing a gas-tight and oil-permeable seal.

In another embodiment of the present teachings, the internal combustion engine may further include at least one inlet valve disposed above a first piston reciprocally disposed within a first individual cylinder of the at least one double cylinder unit. The at least one inlet valve preferably opens and closes an intake channel upstream of the at least one intake valve. An inlet-side cylinder space may be defined above the first piston.

In addition or in the alternative, at least one outlet valve may be disposed above a second piston reciprocally disposed in a second individual cylinder of the at least one double cylinder unit. In this case, the at least one outlet valve preferably opens and closes an exhaust channel downstream of the at least one outlet valve. An outlet-side cylinder space may be defined above the second piston.

Optionally, a charging device may be provided to supply a high pressure charge to the intake channel.

In addition or in the alternative, one or more of the above embodiments may be operated by actuating the inlet and outlet valves such that the reciprocating internal combustion engine operates at least in one engine load and/or engine speed range according to a two-stroke operation with longitudinal scavenging from the inlet-side cylinder space to the outlet-side cylinder space. In addition or in the alternative, the valves may be actuated such that the internal combustion engine operates according to a four-stroke operation during at least one of engine idling and partial engine loading and may be operated according to the two-stroke operation during at least one other engine load range.

Optionally, the outlet valve may be opened before the pistons expose the at least one slot during a working stroke. Furthermore, switching between the two- and four-stroke operation may be effected by at least one cam of a camshaft, which is rotating at half the crankshaft speed, being switched such that said at least one cam is inactive during four-stroke operation.

In another embodiment of the present teachings, apparatus for adjusting a valve stroke function of at least one valve of an internal combustion engine are taught and may optionally include a camshaft having a first cam and a second cam. A valve lever may be pivotally mounted on a mechanically fixed component within the engine compartment, or may be arranged and constructed to be mounted on a component that will be stationary within the engine compartment. The valve lever is also preferably in contact with a stem of a valve, such an intake valve or an outlet valve. The valve lever also preferably includes an interlocking mechanism.

A first follower lever may be pivotally attached to the valve lever so as to follow the first cam. A second follower lever may be attached to the valve lever so as to follow the second cam.

The interlocking mechanism preferably may be actuated so as to selectively (releaseably) rigidly connect one of the first follower lever and the second follower lever to the valve lever. Preferably, when the first follower lever is interlocked with the valve lever, the valve is actuated in accordance with the first cam and, when the second follower lever is interlocked with the valve lever, the valve is actuated in accordance with the second cam. Optionally, the valve lever may be mounted on a mechanically fixed, hydraulic clearance-compensating element.

In addition or in the alternative, an annular surface may be defined on the camshaft between the first cam and the second cam. A contact surface of the valve lever may rest on the annular surface when the first and second follower levers are unlocked.

In addition or in the alternative, the cam shaft may include at least two second cams and two annular surfaces defined between the first cam and the respective second cams. The valve lever may include two arms having respective contact surfaces designed to rest on the respective annular surface. The arms may project from a base portion that rests on a stem of the valve. The base portion preferably supports the interlocking mechanism.

In addition or in the alternative, the first follower lever may be defined as an inner lever that is pivotally attached at a distance from the base portion between the arms of the valve lever and may include a follower member that follows the first cam. A recess or through hole may be defined in the first follower lever so as to engage an interlocking element of the interlocking mechanism.

In addition or in the alternative, the second follower lever may be formed as a generally U-shaped outer lever, which U-shaped lever is pivotally attached at a distance from the base portion. The arms and the base portion of the valve lever are preferably accommodated within the U-shaped lever. The arms may include contact elements for following the second cam. A cross-piece may connect the arms and may include a recess or through hole for engaging the interlocking element of the interlocking mechanism.

In addition or in the alternative, the first follower lever, in its unlocked state, may be arranged and constructed to be urged in spring contact against the first cam and the second follower lever, in its unlocked state, may be arranged and constructed to be urged in spring contact against the second cam. Optionally, one of the first and second cams is arranged and constructed to operate the internal combustion engine in a two-stroke mode and one of the first and second cams is arranged and constructed to operate the internal combustion engine in a four-stroke mode.

Each of the additional features and teachings disclosed below may be utilized separately or in conjunction with other features and teachings to provide improved engines and valve actuating devices and methods for designing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Referring to FIG. 1, a twin-piston engine may comprise an engine housing 2, in which a crankshaft 4 having rotational axis A is rotatably mounted. The crankshaft 4 comprises at least one crank. Connecting rods 6, 8 are mounted on the crank and each connecting rod 6, 8 is connected to a piston 10, 12. One piston 10, 12 is reciprocally movably disposed within each individual cylinder 14, 16 of a double-cylinder unit 17. The individual cylinders 14, 16, which are preferably circular (cylindrical) in cross-section, have a common cylinder wall 18. The engine housing 2 may comprise one or more double cylinder units 17 (i.e., the engine may have 2, 4, 6, 8, etc. total cylinders).

In FIG. 1, the rotational axis A of the crankshaft 4 is located centrally between the longitudinal axes of the cylinder 14, 16, which axes are generally parallel in this embodiment.

The individual cylinders 14 and 16 are open at the top, thereby defining respective cylinder spaces 19, 20 above the head of the pistons 10, 12. The cylinder spaces 19, 20 extend over and communicate with a common combustion chamber 21 formed in the cylinder head 23. In the present embodiment, the common combustion chamber 21 is conical or roof-shaped, but other shapes are possible according to the present teachings.

At least one inlet channel (passage or conduit) 22 and at least one outlet channel (passage or conduit) 24 open into (communicate with) the combustion chamber 21. At least one inlet valve 26 operates in the inlet channel 22. At least one outlet valve 28 operates in the outlet channel 24. At least one spark plug 30 is arranged centrally in the combustion chamber 21 in embodiments in which the engine operates as an Otto engine (i.e., an engine that operates using gasoline).

Due to the different lateral offsets between the cranks of the crankshaft 4 and the axes of motion of the pistons 10, 12, the pistons 10 and 12 do not move (reciprocate) exactly synchronously in this embodiment. Instead, the pistons 10, 12 move or reciprocate such that one piston 10 is advanced relative to the other piston 12.

For optimum operation of the twin-piston engine when constructed as a diesel engine, e.g., good charge-filling, little residual gas and high compression, it can be advantageous for the two pistons 10, 12 to reach their top dead center position (point) at the same time, or substantially at the same time. As noted above, the pistons 10, 12 of FIG. 1 do not reach their top dead center point at the same time, because the bearing axes of the connecting rods 6 and 8 coincide on the crankpin. Consequently, both pistons 10, 12 can not simultaneously reach its top dead center position (i.e., the extended position of its relevant connecting rod 6, 8) at the same time, because the bearing axis of the respective connecting rod on the crankpin lies on a straight line with the bearing axis of the connecting rod on the piston.

Figure 2:
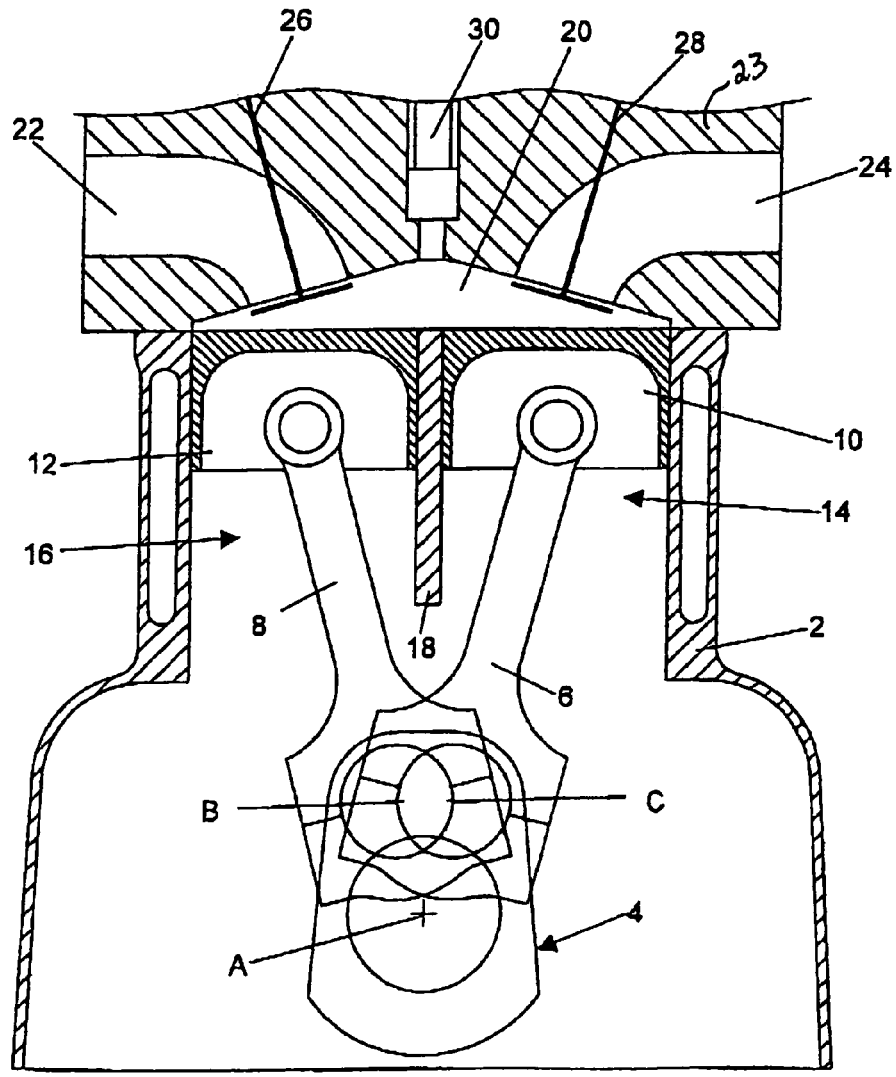
FIG. 2 is a cross-section, perpendicular to the axis of the crankshaft, through a representative twin-piston engine according to the present teaching having a crank drive modified so that the pistons reach their top dead center position substantially simultaneously.

Thus, in one advantageous embodiment of the present teachings, FIG. 2 shows an example in which the pistons 10, 12 simultaneously, or substantially simultaneously, reach their top dead center positions. For this purpose, the crankpin of the crankshaft 4 is shaped (e.g., split) so as to provide two crankpin portions that are spaced apart (offset) in the longitudinal direction of the crankshaft 4. The crankpin portions are also offset with respect to each other relative to the angle of rotation. Therefore, the crankpin portions are arranged such that the two connecting rods 6, 8 reach the extended position (top dead center position) simultaneously. The longitudinal axis of one crankpin is designated as axis B and the longitudinal axis of the other crankpin is designated as axis C.

Figure 3:
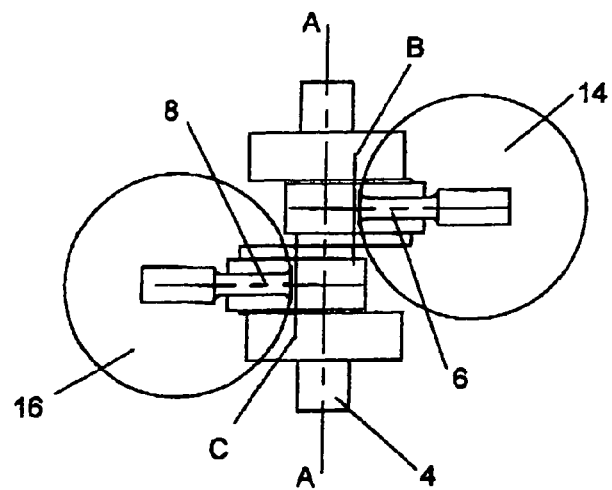
FIG. 3 is a schematic view of a portion of the crankshaft shown in FIG. 2.

FIG. 3 shows a schematic view of a cutaway portion of the crankshaft 4 of FIG. 2 comprising a crankpin section (axis B), on which the connecting rod 6 is mounted, and a crankpin section (axis C), on which the connecting rod 8 is mounted. If the crank and piston bearings of the respective connecting rods 6, 8 are located in the same plane, the individual cylinders 14 and 16 are separated from each other perpendicular to the axis A of the crankshaft 4. In addition, the cylinders 14, 16 are also offset relative to each other along the axial direction of the crankshaft 4.

Figure 4:
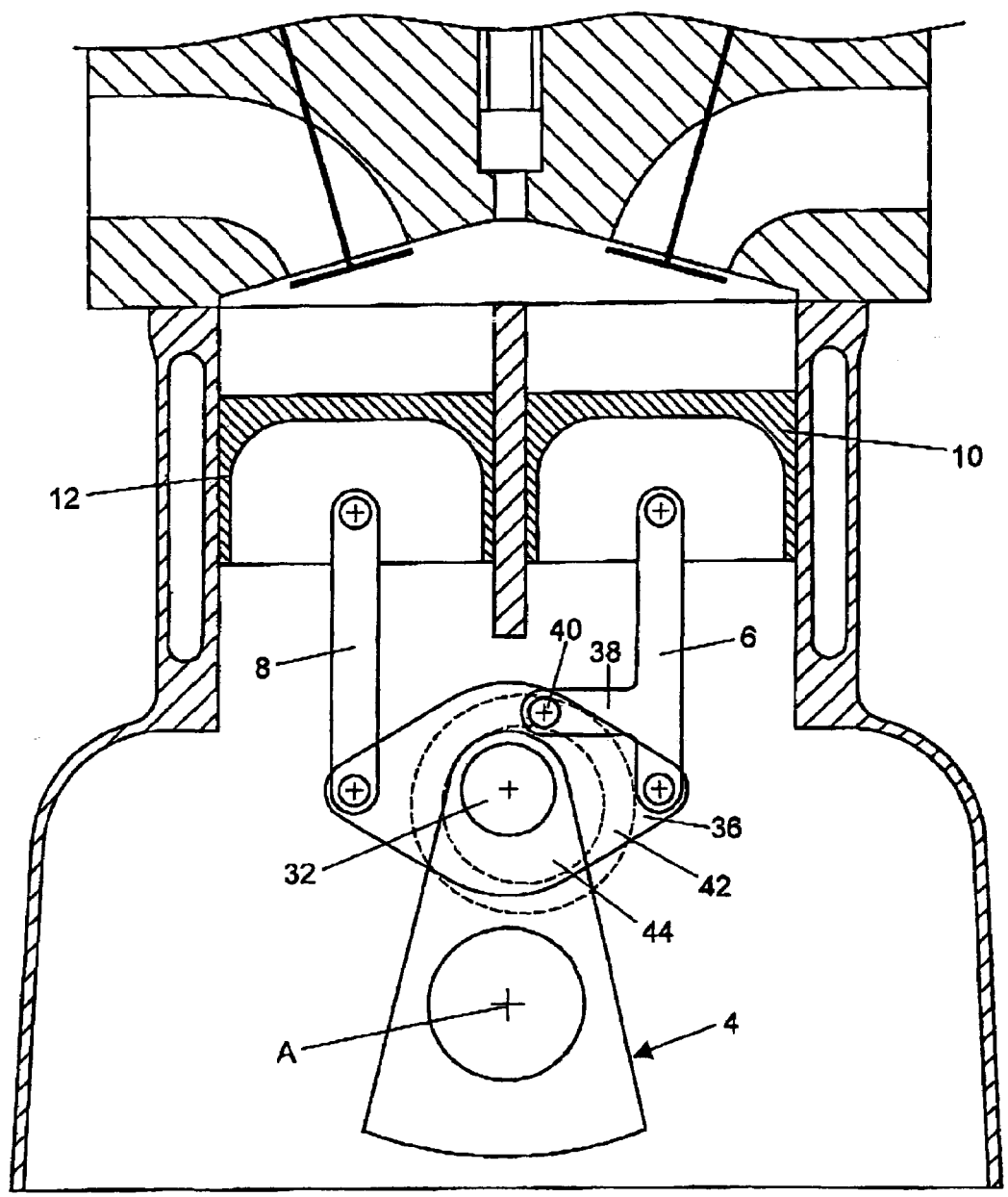
FIG. 4 is a cross-section, perpendicular to the axis of the crankshaft, through another representative twin-piston engine having another modified crank drive.

FIG. 4 shows another representative embodiment, in which the pistons 10, 12 are connected to the crankshaft 4 via their connecting rods 6, 8 such that the pistons 10, 12 simultaneously reach their top dead center position. For this purpose, a bridge member 36 is mounted on the crankpin 32 of the crankshaft 4. The connecting rods 6, 8 are mounted on the outer sides of bridge member 36 away from the crankpin 32. In order to ensure that the bridge member 36 is located in a well-defined tilting position, at which position both pistons 10, 12 are located in their top dead center position, a guide device is formed as a lug disposed on the connecting rod 6. The lug engages a pin 40 slidably disposed in a circumferential groove 42, which groove 42 is defined within a disk cam 44 that is rigidly or fixedly connected to the crankshaft 4. By changing the location of the groove 42 relative to the axis of the crankpin 32, the movement (reciprocation) paths of the pistons 10, 12 can be influenced. For example, by making the groove 42 eccentric relative to the axis of the crankpin 4, the pistons 10, 12 would not reach their respective top dead center positions together. Thus, the position of the groove 42 on the disk cam 44 may be variously changed in order to influence how the pistons 10, 12 reciprocate relative to each other.

It is to be understood that the embodiments described herein are only examples of possibilities for constructing the crank drive such that the pistons 10, 12 will simultaneously, or substantially simultaneously, reach their top dead center when only one crankshaft is utilized. Naturally, various other designs can be easily made by a skilled person after considering the present teachings and the present teachings are not particularly limited in this regard.

Figure 5:
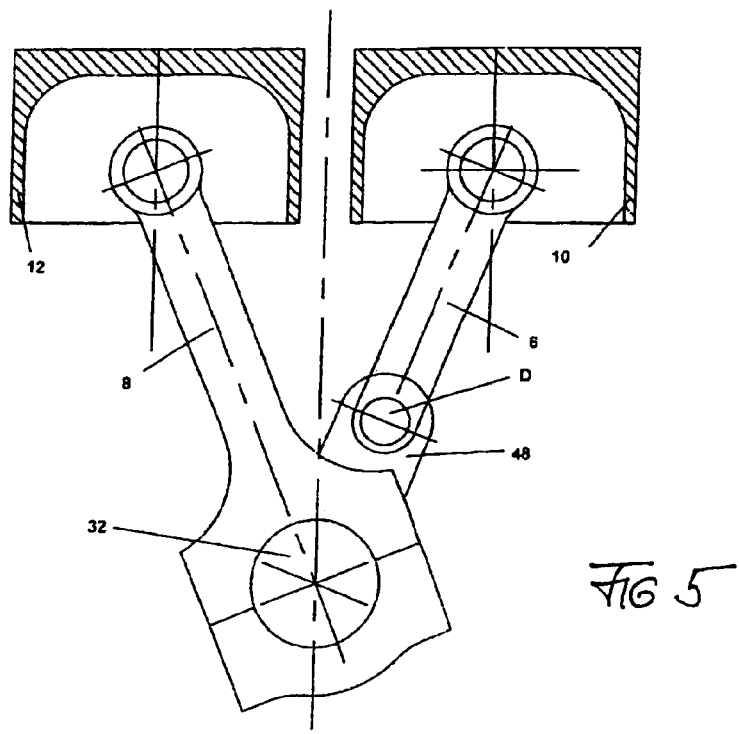
FIG. 5 is a cross-section, perpendicular to the axis of the crankshaft, through a twin-piston engine having one piston mounted on a crank of the crankshaft and the other position mounted on a lug of the crankshaft.

FIG. 5 shows another representative embodiment, in which the pistons 10, 12 substantially simultaneously attain (reach) their top dead center position. In this embodiment, the connecting rod 8 is mounted directly on a crankpin 32 of the crankshaft 4, whereas the connecting rod 6 is mounted on a lug (projection) 48 of the connecting rod 8. The bearing axis D of the connecting rod 6 on the lug 48 is arranged such that both pistons 10, 12 reach their top dead center position approximately simultaneously. It is to be understood that different top dead center positions and bottom dead center positions can be realized by changing the position of the lug 48. Further, leads or lags between the pistons 10, 12 can be achieved by the changing the position of the bearing axis D on the lug 48 or by offsetting the bearing axis with respect to the axis of the crankpin 32.

Figure 6:
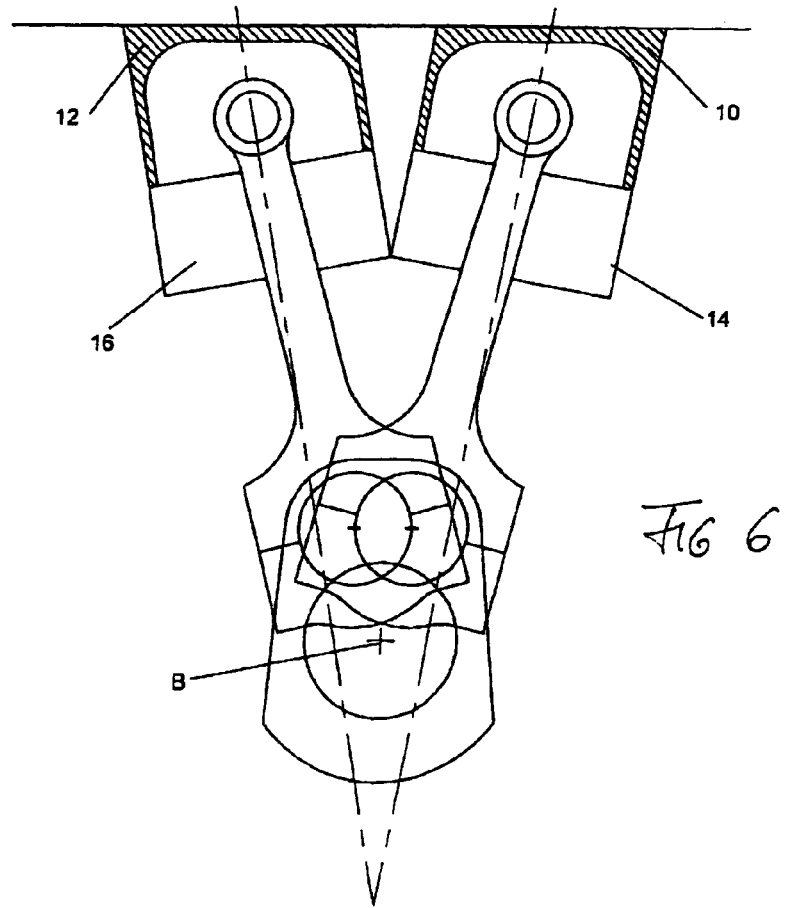
FIG. 6 is a cross-section, perpendicular to the crankshaft axis, of a modified twin-piston engine, in which the cylinders are arranged at an angle with respect to each other.

In the above-described embodiments, the longitudinal axes of the cylinders 14, 16 are parallel to each other. However, FIG. 6 shows an embodiment in which the cylinders 14, 16 are arranged at an angle with respect to each other. In this embodiment, the respective axes move away from each other with increasing distance from the crankshaft. In the opposite direction (i.e., towards the crankshaft 4), the respective axes intersect, at least when hypothetically visualised. The point of intersection of the cylinder axes is not required to coincide with the axis of the crankshaft 4. Furthermore, portions of the skirts of the pistons 10, 12 that face or oppose each other can be cut out or otherwise removed in order to make possible a more compact design.

In the twin-piston engines according to the present teachings, large cross-sectional areas are generally available above the pistons 10, 12 for the inlet and outlet valves 26, 28. In particular, in the case of a roof-shaped combustion chamber 21 as shown in FIGS. 1 and 2, it is advantageous to provide three inlet valves 26 and three outlet valves 28 in order to optimally utilize the available cross-sectional areas. A representative arrangement having three inlet valves 26 and three outlet valves 28 is shown schematically in FIG. 7, which arrangement provides sufficient rigidity of the cylinder head 23 to withstand the high combustion forces that are generated within a combustion chamber 21 having a relatively large cross-section.

A plurality of spark plugs and a plurality of injection units can be disposed within the combustion chamber 21 for optimum combustion and the best possible thermodynamic conditions.

Figure 7:
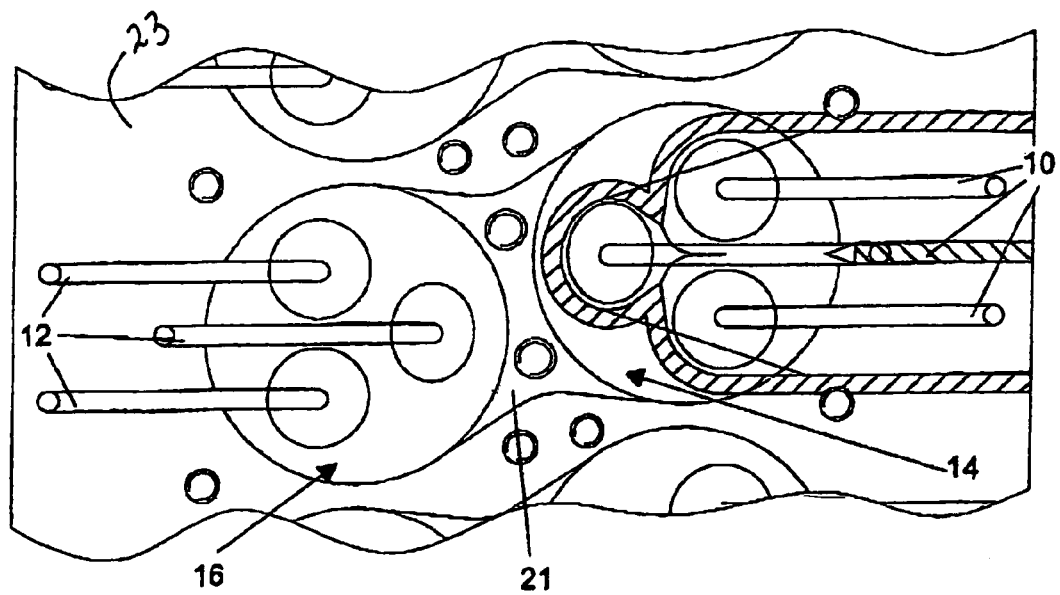
FIG. 7 is a schematic view of a cutaway portion of another representative twin-piston engine.

The arrangement of the individual cylinders 14 and 16 shown in FIG. 7 corresponds to the arrangement that may be utilized with the assembly of FIG. 3. As is indicated schematically in FIG. 7, the combustion chamber 21 formed in the cylinder head 23 partially covers (overlaps) the two individual cylinders 14, 16 and is somewhat constricted in the region that connects the two individual cylinders 14, 16. Sufficiently large bearing surfaces are available to provide a cylinder head seal (packing) between adjoining (adjacent) double-cylinder units 17, which each comprise two individual cylinders 14, 16.

As can be further seen from FIG. 7, there is a high degree of freedom for shaping (designing) the front (bottom) face of the cylinder head 21 as a "squeeze surface." In this context, a "squeeze surface" is intended to mean, e.g., a surface of the cylinder head that is almost contacted by (opposite to) the piston head when the piston 10, 12 reaches its top dead center position. The combustion chamber 21 can be shaped such that squeeze surfaces exist above each of the individual cylinders 14, 16. By appropriate shaping (designing) of the connecting region formed in the cylinder head 23 between the individual cylinders 14, 16, there is freedom (space) for squeeze flows (e.g., a gas) to move. The connections (communication paths) between the cylinder spaces 19, 20 of the individual cylinders 14, 16 above the combustion chamber 21 formed in the cylinder head 23 can be differently shaped. For example, a very large connecting cross-section and correspondingly large combustion chamber 21 can be provided, in which compression will be reduced, or a relatively small combustion chamber 21 can connect the two cylinder spaces 19, 20.

If the volume of the chamber 21 is reduced to the point that it effectively becomes zero, the cylinder spaces 19, 20 will be completely separated from each other so that the adjacent combustion spaces are also completely separated. In this case, if the cylinder spaces are not connected elsewhere (i.e., do not communicate via another path, e.g., via the common cylinder wall 18 as will be discussed further below), each cylinder space 19, 20 requires its own inlet and outlet valves 26, 28.

Figure 8:
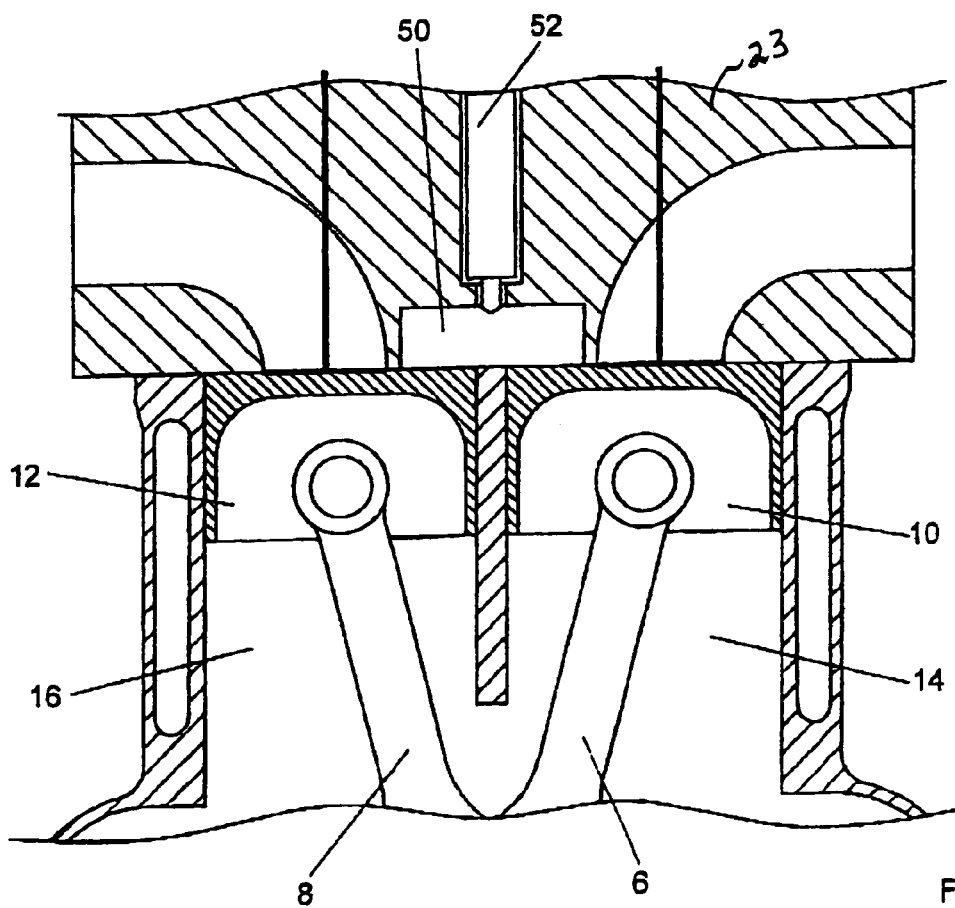
FIG. 8 is a cutaway portion of a cross-section parallel to the piston movement of another engine according to the present teachings.

FIG. 8 shows another representative embodiment of a double-cylinder unit 17 having two individual cylinders 14 and 16. In this example, the cylinder head 23 is shaped (designed) such that a connection (communication path) between the two cylinder spaces 19, 20 is substantially formed by only a depression or recess 50 that is formed in the cylinder head 23. An injection nozzle 52 is disposed in the recess 50. In this case, when the pistons 10, 12 are moved to their top dead center position, the combustion chamber (21) merely consists of a very flat-shaped (theoretically, zero thickness) disk having a bulge formed by the recess 50. This embodiment is well suited for a direct-injection diesel engine, in which the combustion chamber recess, which is usually formed in the piston, is instead formed as the recess 50 of the cylinder head 21. The recess 50 is common to both pistons 10, 12.

Figure 9:
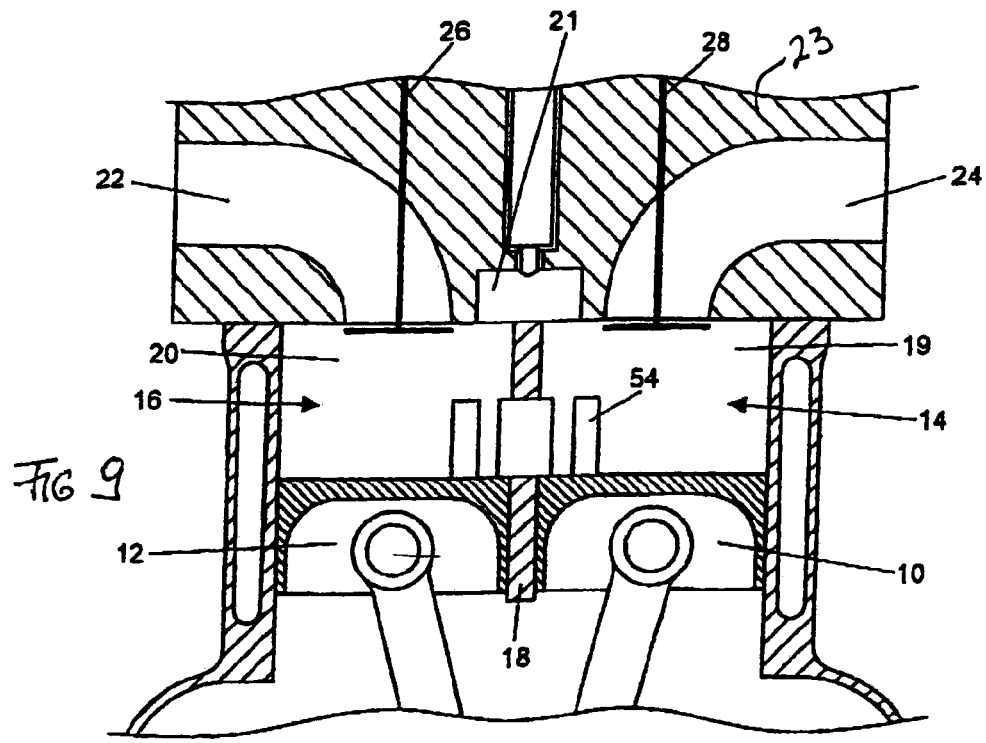
FIG. 9 is a cutaway portion of a cross-section parallel to the piston movement of a design of a representative twin-piston engine having one or more slot(s) defined in the cylinder wall separating two adjacent individual cylinders.

FIG. 9 shows another embodiment that is similar to FIG. 8. However, in FIG. 9, one or more slot(s) 54 are defined in the common cylinder wall 18 and the slot(s) 54 are arranged such that, during movement of the pistons 10, 12 to their bottom dead center position, connections (communication ports or communication paths) between the cylinder spaces 19, 20 of the individual cylinders 14, 16 are exposed.

The embodiment of the twin-piston engine shown in FIG. 9 is particularly suitable for two-stroke operation. A representative method for operating this twin-piston engine will now be described. When the pistons 10, 12 move upwardly from their bottom dead center position (i.e., approximately the piston position shown in FIG. 9), the pistons 10, 12 travel (slide) over the slot(s) 54. As a result, the connection (communication path, i.e., the slot(s) 54) between the cylinder spaces 19, 20 is interrupted or blocked and the charge (i.e., the fuel and/or air) located above the piston heads is compressed. Near the top dead center position, fuel is injected and self-ignites in the case of diesel fuel. In the case of "Otto fuel" (i.e., gasoline), the fuel is externally ignited, e.g., by a spark plug.

The pistons 10, 12 will then move downwards due the gas pressure generated by the combustion of the charge and travel (slide) over the slot(s) 54 again. Advantageously, shortly before the pistons 10, 12 expose the slot(s) 54 between the cylinder spaces 19, 20 during the working (combustion) stroke, the outlet valve(s) 28 is (are) opened. In this case, the charge (i.e., combusted fuel or exhaust gas) will begin to be exhausted and the burned charge will be longitudinally exhausted (scavenged) via the connection (communication path) between the cylinder spaces 19 and 20 (i.e., via the common combustion chamber 21).

When the pistons 10, 12 pass (slide) over the slot(s) 54, thereby uncovering (exposing) the slot(s) 54, comprehensive pressure equalisation occurs between the cylinder spaces 19, 20. Due to this scavenging (exhaustion) action, a pressure drop (differential) exists between the pressure in the inlet channel 22, to which fresh charge is supplied under very high pressure from a charging device, and the lesser pressure in the outlet channel 28. Consequently, fresh charge (air and/or fuel) then flows into the cylinder space 20 and expels the burned charge (combusted fuel products) located therein. As a result, the burned charge is forced to flow, via the slot(s) 54 and the combustion chamber 21, into the cylinder space 19 due to the pressure of the incoming fresh charge. From there, the burned charge then flows into the outlet channel 24 so that the cylinder space 19 will also be filled with fresh charge (i.e., un-combusted or un-burned fuel/air).

When the pistons 10, 12 move upwards again after passing through their bottom dead center point, the valves 26, 28 are closed and preferably, the outlet valve(s) 28 is (are) closed shortly before the inlet valve(s) 26. As a result of closing the valves 26, 28, the fresh charge, which has flowed into the cylinder spaces 19, 20, will be compressed.

Thus, the embodiment shown in FIG. 9 provides a twin-piston engine that can be advantageously utilized as a two-stroke engine. This engine enables burned charge to be "scavenged" (expelled or exhausted) through the slot(s) 54 and the combustion chamber 21, which is formed by the recess in the cylinder head 23, along a relatively short (longitudinal) scavenging (exhaustion) distance. According to the present teachings, the combustion chamber 21 can be designed to have an extremely small volume, which volume can decrease to zero (or substantially zero) if the fuel is directly injected into both cylinder spaces 19, 20. For the purpose of the present teachings, the term "scavenging" is intended to mean the combined intake and exhaust process that clears the cylinder spaces 19, 20 of burned gases and fills the cylinder spaces 19, 20 with a fresh mixture of air and fuel.

Turbochargers, motor-driven chargers and other known charging devices can be suitably utilized as charging devices for charging the fresh fuel/air mixture into the cylinder spaces 19, 20 according to the present teachings.

The height of the slot(s) 54 is preferably selected or designed such that the upper edge of the slot 54 is defined (lies) between about 10–40% of the total piston stroke (length) above upper edge of the piston 10, 12 when the piston 10, 12 is positioned at its bottom dead center point. In addition, it is noted that the pistons 10, 12 are not required to move synchronously to their top dead center point in this embodiment. For example, the piston 12 may reach its top dead center point after the piston 10 has already reached its top dead center point.

In the twin-piston engine according to the embodiment shown in FIG. 9, the slot(s) 54 substantially perform only a connecting (communication) function and do not perform any control function, such as e.g., outlet or inlet valve slot(s).

Figure 10:
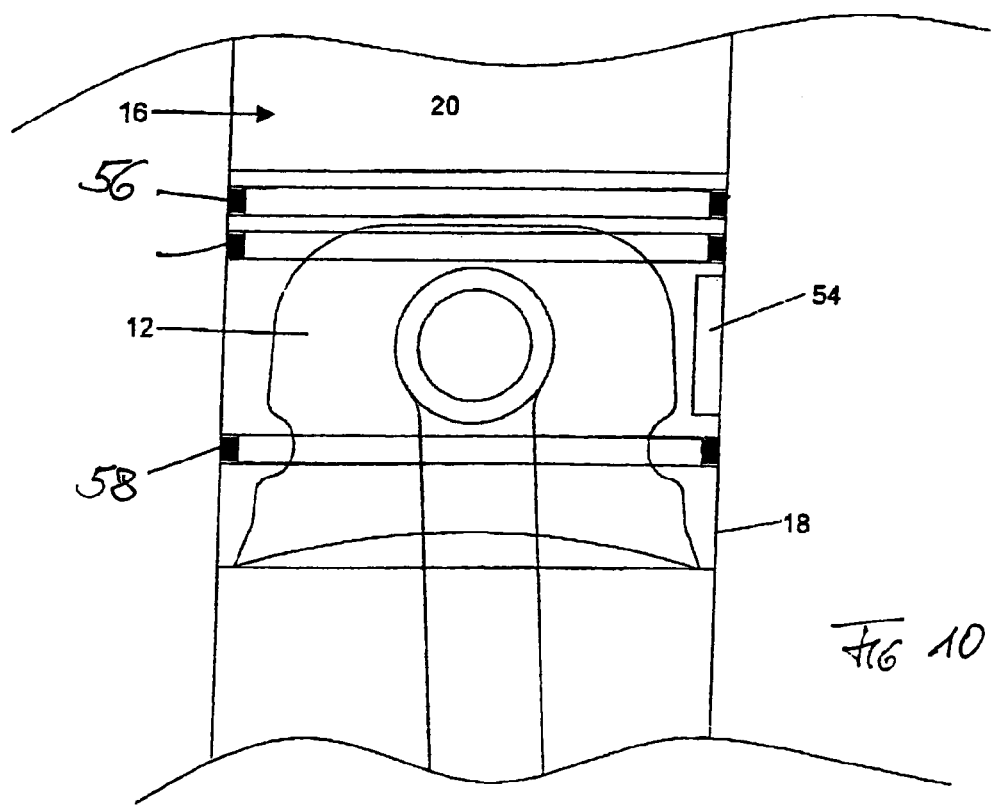
FIG. 10 shows in greater detail one piston of FIG. 9 in order to further explain the construction of the pistons and the arrangement of the slots.

In order to prevent a connection (communication path) between the cylinder spaces 19, 20 or the combustion chamber 21 and the crank space of the twin-piston engine while the pistons 10, 12 are positioned over the slot(s) 54 (i.e., when the side walls of the pistons 10, 12 are covering or blocking the slot(s) 54), the pistons 10, 12 are preferably fitted with rings, as will be explained with reference to FIG. 10. In the embodiment shown in FIG. 10, at least one upper piston ring 56 and at least one lower piston ring 58 are disposed around the pistons 10, 12, although only piston 12 is shown for the purpose of illustration in FIG. 10.

The spacing (distance) between the rings 56, 58 is preferably larger (longer) than the height of the slot(s) 54 in the longitudinal (axial) direction of the cylinders 14, 16. In this case, when the lower piston ring 58 travels (slides) over the slot(s) 54 during the downward stroke of the piston 10, 12, the cylinder space 20 above the upper piston ring 56 is reliably sealed in a gas-tight (air-tight) manner in the direction towards the crank space. When the upper piston ring 56 passes (slides) over the slot(s) 54, a gas-tight seal is ensured above the lower piston ring 58. The lower piston ring 58 is preferably gas-tight, but oil permeable, so as to ensure adequate lubrication of the running (sliding) surfaces of the cylinder 16.

As compared with four-stroke engines, two-stroke engines have the advantage of uniform high rotational speeds and, when being sufficiently charged, higher torque and better performance. However, it has been quite difficult to tune two-stroke engines over a wide range of speeds, because the charge (i.e., the gas in the cylinder spaces 19, 20) is exchanged by "scavenging" or expelling the burned charge using the force of the incoming fresh charge. Thus, especially when the engine is operating in the engine speed range near idling, conventional two-stroke engines usually do not operate completely satisfactorily. Four-stroke engines, on the other hand, operate extremely well in these conditions (i.e., near idling or under partial load), because the burned charge is forcibly expelled or exhausted during an exhaust stroke.

However, the twin-piston engines according to the present teachings are well suited for both two-stroke and four-stroke operation, as will be further discussed below. In another advantageous embodiment of the present teachings, a valve actuating device is taught that may be utilized with the above and below described engines to enable selective switching between two-stroke and four-stroke operation. This representative valve actuating device will be further discussed with reference to FIGS. 11–13. However, it should be noted that other devices for shutting down or stroke switching of valves 26, 28 are known from the literature and other types of valve actuating devices capable of switching between two-stroke and four-stroke operation may be suitably used with the present teachings.

FIG. 11 shows a camshaft 60 comprising a four-stroke cam 64 disposed between two two-stroke cams 62. The two-stroke cams 62 each have two opposing cam lobes, whereas the four-stroke cam 64 has only one lobe. Annular surfaces 66 are formed between the four-stroke cam 64 and each of the two-stroke cams 62.

A representative transmission mechanism (e.g., a valve actuator or valve lifter) will be described with reference to FIGS. 12 and 13. This transmission mechanism transmits (transfers) rotation of the cams 62, 64 to the valve 70 in a manner that permits changing whether the two-stroke cams 62 or the four-stroke cam 64 actuates the valve. FIG. 12 shows the transmission mechanism in an exploded view. FIG. 13 shows said mechanism in perspective view in the assembled state. The transmission mechanism may actuate one or a plurality of valves 70. Furthermore, the valve 70 may correspond to one or both of valves 26, 28 in the above-described embodiments.

The representative transmission mechanism comprises a valve lever 72 having two arms 74 and 76 extending from a base portion 80. A bolt 78 extends through the free ends of the respective arms 74, 76. An interlocking mechanism (not shown) is disposed in the base portion 80, which interlocking mechanism enables an interlocking pin 82 to be projected from the base portion 80 in the direction between the arms 74 and 76 or in the opposite direction, as desired. Contact surfaces 84 are defined on the upper sides of the respective arms 74, 76.

The transmission mechanism also comprises an inner lever 86 having two arms 88. Holes are formed in the free ends of the arms 88 and a cross-piece portion 90 connects the arms 88. The inner lever 86 is mounted on the bolt 78 between the arms 74 and 76 of the valve lever 72 such that the cross-piece portion 90 of the inner lever 86 is directly adjacent to the base portion 80. Therefore, the interlocking pin 82 can engage a recess or through hole (not shown) formed in the cross-piece portion 90. A roller 92 is mounted between the arms 88 of the inner lever 86.

An outer spring 98 is supported between a connecting plate 94 of the arms 88 and a contact lug 96 of the valve lever 72. The contact lug 96 is formed between the arms 74 and 76.

A generally U-shaped outer lever 100 comprises arms 102. The bolt 78 extends through the free ends of the arms 102, such that the outer lever 100 overlaps the valve lever 72. A cross-piece 104 connects the arms 102 and is adjacent to the outer side of the base portion 80. A connecting plate 110 connects the free ends of the arms 102. Therefore, the interlocking pin 82 can be shifted or moved within the base portion 80 so that an end portion of the pin 82 projects from the base portion 80 and engages a recess (or through hole) 106 defined in the cross-piece 104. Contact surfaces 108 are formed on the upper sides of the arms 102. An inner spring 112 projects through the outer spring 98 and is supported between the connecting plate 110 and the contact lug 96 of the valve lever 72.

FIG. 13 shows the above-described components in the assembled state, in which the inner lever 86 and the outer lever 100 are pivotably mounted on the bolt 78 that extends through the arms of all three levers 72, 86, 100. The contact lug 96 of the valve lever 72 is supported on a mechanically fixed (i.e., stationary within the engine compartment), valve clearance compensating element 114 and the underside of the base portion 80 is supported on the stem of the valve 70.

The camshaft 60 of FIG. 11 is disposed over the assembly of FIG. 13 in the operational state of the valve actuating device. When the inner lever 86 is unlocked from the outer lever 100, whereby the levers 86, 100 are pivotable relative to the valve lever 72, the contact surfaces 84 of the valve lever 72 are supported on the annular surfaces 66 of the camshaft 60. Further, the valve lever 72 abuts against the closed valve 70 without any clearance due to the biasing (urging) force supplied by the valve clearance compensating element 114. In addition, the inner lever 86 is biased by the force of the outer spring 98 so that the roller 92 permanently (i.e., without interruption) abuts or contacts the four-stroke cam 64. The component dimensioning is such, when the cam pitch circle (base portion) of the cam 64 slides against (contacts) the roller 92, the recess (not shown) formed in the cross-piece portion 90 is located opposite to the interlocking pin 82, which pin 82 has an end portion that can be projected from the base portion 80.

When the cam lobe slides over (contacts) the roller 92, the inner lever 86 dips into the valve lever 72 so that the cam lobe is inactive (i.e., the valve 70 is not actuated).

Similarly, the outer lever 100 is biased by the inner spring 112 (shown in FIG. 12) in the counter-clockwise direction of the assembly shown in FIG. 13. Therefore, the contact surfaces 108 permanently (i.e., without interruption) contact the respective two-stroke cams 62. The component dimensioning is such that, when the pitch circle portions (base portions) of the two-stroke cams 62 slide over (contact) the contact surfaces 108, the recess 106 is located opposite to the position from which the interlocking pin 82 can be retracted into the base portion 80. In the unlocked state, the outer lever 100 tilts or pivots over the valve lever 72 when the pitch circle (base) portions of the two-stroke cams 62 slide over (contact) the contact surfaces 108. When the levers are unlocked, the valve 70 is thus permanently closed.

When the inner lever 86 is interlocked with the valve lever 72, the four-stroke cam 64 is active for actuating the valve 70. When the outer lever 100 is interlocked with the valve lever 72, the two-stroke cams 62 are active for actuating the valve 70. According to the requirements for two-stroke operation, the two-stroke cams 62 actuate (open and close)

the valve 70 at twice the frequency as compared with the actuation of the valve 70 by the four-stroke cam 74.

The phase positions of the four-stroke cam 64 and the two-stroke cams 62 are preferably selected such that optimum two-stroke or four-stroke operation is respectively achieved. A phase shifter can additionally be disposed in a known manner between a crankshaft, which drives the camshaft 60, and the camshaft.

A representative example of the switching or interlocking mechanism, which is disposed in the base portion 80, will be explained with reference to FIGS. 14 and 15, which show a cross-section through the lever pivotally mounted about the bolt 78, i.e., the inner lever 86 with the roller 92 is mounted on the bolt 78, together with the valve lever 72 and the outer lever 100.

Figure 14:
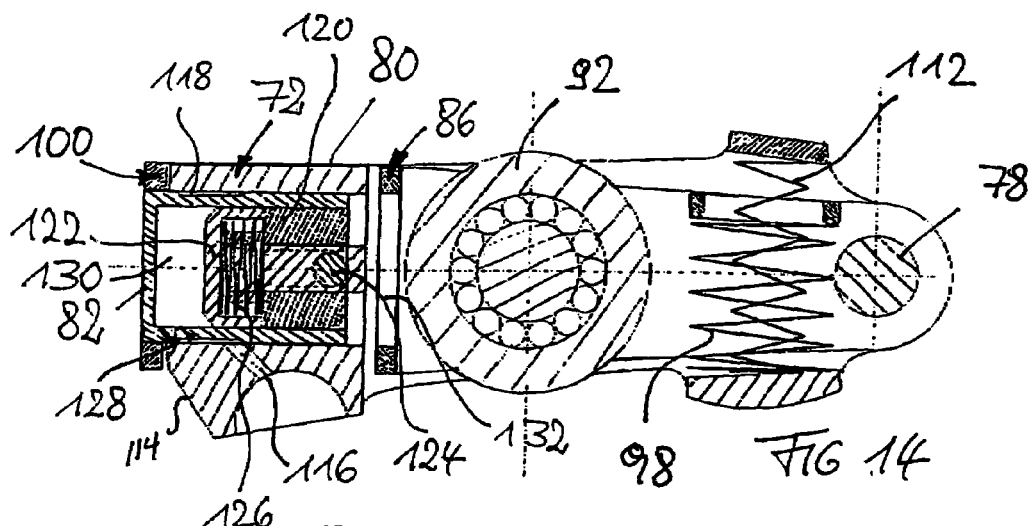
FIG. 14 is a cross-section through the lever shown in FIG. 13 for explaining the switchover or interlocking mechanism.
Figure 15:
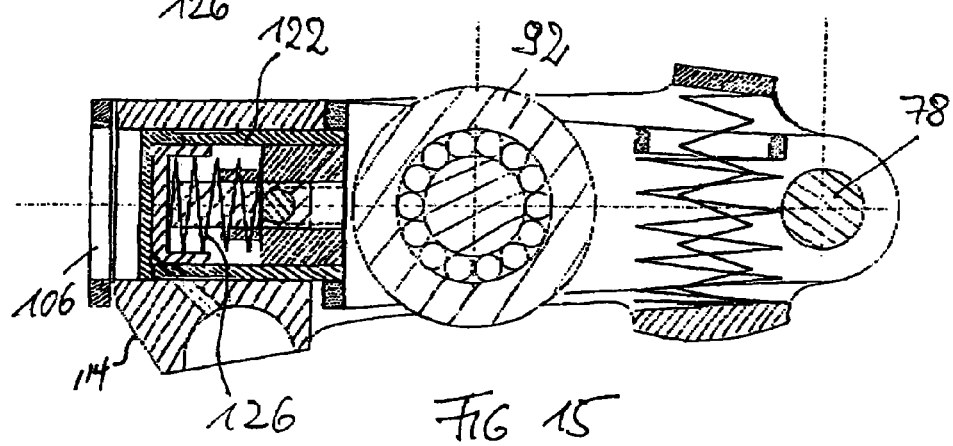
FIG. 15 shows the assembly of FIG. 14 in another operating state.

As shown in FIGS. 14 and 15, the base portion 80 of the valve lever 72 is mounted on the clearance compensating element 114, which includes a connecting hole 116 leading into a through hole 118 defined in the base portion 80. The interlocking pin 82 is movably guided in the hole 118. The interlocking pin 82 is hollow and, in accordance with FIGS. 14 and 15, is closed on the left side by a front wall and on the right side by a sleeve 120. The shaft of a generally T-shaped dividing wall component 122 is guided in the sleeve 120. The shaft of the dividing wall component 122 is rigidly connected to the base portion 80 by means of a transverse pin 124. In order for the interlocking pin 82 to be displaceable relative to the dividing wall component 122, the pin 124 contains a slot (not shown) in the region of the transverse pin 124. A spring 126 is supported between the sleeve 120 and the front wall of the dividing wall component 122.

A representative method for operating the assembly of FIGS. 14 and 15 will now be described. When pressure (e.g., pressurized hydraulic fluid) is introduced into the connecting hole 116, the hydraulic fluid passes through an annular space between the hollow interlocking pin 82 and the inside of the through hole 118 and through an opening 128 into a space 130 between the front wall of the interlocking pin 82 and the dividing wall component 122. As a result, the interlocking pin 82 is shifted (moved) to the left as shown in FIG. 14 and enters into the recess 106 (FIGS. 13 and 15) of the outer lever 100. As a result, the outer lever 100 will be interlocked with the valve lever 72.

When the pressure of the hydraulic fluid drops, the spring 126 pushes (urges) the interlocking pin 82 to the right, as shown in FIGS. 14, 15, due to its engagement with the sleeve 120 of the interlocking pin 82. Therefore, the left end of the pin 82 comes free from (exits) the recess 106 and the right end of the pin 82 enters into a recess 132 defined in the cross-piece portion 90 of the inner lever 86, as shown in FIG. 15. Therefore, the inner lever 86 will be interlocked with the valve lever 72. Preferably, the inside of the hollow interlocking pin 82 is guided tightly (closely) on the outside of the dividing wall component 122.

By suitable longitudinal dimensioning of the interlocking pin 82, it is ensured, as can be seen directly from the figures, that at any one time the valve lever 72 can be interlocked with only one of the outer lever 100 or the inner lever 86.

Of course, numerous modifications of the switchover and interlocking mechanism are possible. For example, by means of a suitable design, it can be ensured that, at a pre-determined pressure of the hydraulic fluid, the interlocking pin 82 is located in a position at which the pin 82 will interlock neither with the outer lever 100 nor with the inner lever 86. Furthermore, the interlocking mechanism can, for example, be a double-acting hydraulic cylinder that is pre-stressed in a central position in a spring-loaded manner. In this case, a piston is moved in one direction when one pressure space is acted upon and, when another pressure space is acted upon by means of hydraulic pressure, the piston is moved in the other direction.

The pressure level or a channel respectively acted upon by pressure to displace the interlocking pin 82 is controlled by means of a controller (e.g., an electronic control device) according to the operating states of the internal combustion engine. The interlocking mechanism can be actuated electromagnetically in a modified embodiment. Of course, the interlocking pin 82 can be constructed such that a specific unlocking of inner lever 86 and the outer lever 100, i.e., a valve shutdown, is not provided; instead, the inner lever 86 may be interlocked in one state and the outer lever 100 may be interlocked in the other state.

The individual levers and contact surfaces can also be constructed in a different manner and can interact with differently arranged cams. The particularly advantageous feature of the above-described arrangement is that the valve 70 is actuated by two differently constructed cams via their respective follower lever (72, 86) that can be interlocked with the valve lever 100.

Figure 16:
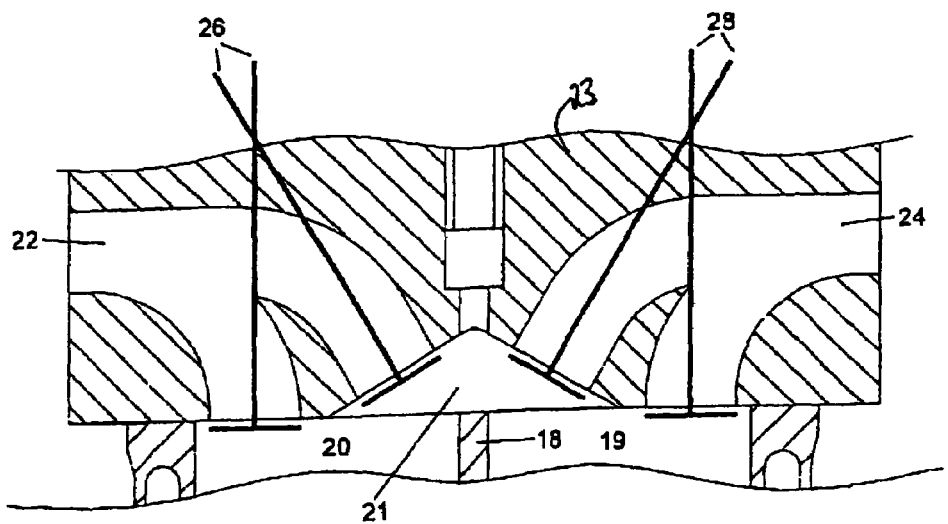
FIG. 16 shows a cutaway portion of a cross-section parallel to the piston movement to show another representative embodiment of a combustion chamber and cylinder spaces.

In another representative embodiment of the present teachings, FIG. 16 shows a modified embodiment of the combustion chamber 21 in a view similar to FIG. 9. In this embodiment also, the combustion chamber 21 does not completely overlap (cover) the cylinder spaces 19 and 20. However, the combustion chamber 21 has a roof-shape. Inlet and outlet valves 26, 28 are disposed in the region of the combustion chamber 21, as well as in the portion of the cylinder head 23 that does not provide a recess over the cylinder spaces 19 and 20.

Switching between two- and four-stroke operations advantageously takes place such that the engine is operated in the four-stroke mode at low to medium engine loading for all speeds. Then, the engine is switched to the two-stroke operation near full load. At high speeds and high engine load, it is possible to switch from two-stroke operation to four-stroke operation when the charge change (gas exchange) according the two-stroke mode is unstable or inefficient.

Another advantageous feature of the twin-piston engine according to the present teachings, which is especially advantageous for switchable operation between two-stroke and four-stroke operation, is that during four-stroke operation and charging with a turbocharger even at low speed (for example, 1000 revolutions per minute (r.p.m.)), a scavenging (exhaust pressure) gradient of the order of magnitude, e.g. of 50 millibar, is sufficient. This scavenging gradient is sufficient to switch to two-stroke operation, in which a higher exhaust volumetric flow is immediately achieved. This higher exhaust volumetric flow accelerates the exhaust turbocharger and rapidly generates the charge pressure required for a higher scavenging gradient. Because a small-volume engine can be designed, due to its high speed stability, according to the present teachings, start-up weakness or a so-called "turbohole" is thereby overcome.

The engines according to the present teachings can be modified in various ways. The external design can have an in-line arrangement, a V arrangement, a Boxer arrangement, a VR arrangement or a W arrangement for the respective individual double-cylinder units 17. Two or more pistons 10, 12, which are operating in the same direction, may communicate with a common combustion chamber 21 so that corresponding multi-cylinder units are provided. The engine can be driven by internal combustion according to the Otto or diesel method or with an external energy supply, such as a Stirling engine. The engine can be operated in 2-stroke, 4-stroke or 2ⁿ-stroke (n is an integer) modes. Instead of three inlet and outlet valves, more or fewer valves can also be used. In addition, the number of inlet valves 26 can also differ from the number of outlet valves 28.

When operated as an Otto engine according to the four-stroke mode, the two cylinders 14 and 16 advantageously have a common combustion chamber 21. When operated as a diesel according the four-stroke mode, the combustion chambers of the cylinders are substantially completely separated and only interconnected (communicate) via the recess. When operated as an Otto engine according to the two-stroke mode, the construction of FIG. 9 is preferably utilized, because this embodiment also makes possible operation as a diesel according to the two-stroke mode.

When constructed as a two-stroke engine, the bore/stroke ratio is preferably designed as a short-stroke, which is advantageous with regard to the attainable valve areas, the short scavenging length (exhaust path distance) and the required cross-sections of the slot(s) 54. On the whole, it is advantageous to design the individual cylinders 14, 16 as compact as possible.

As was noted above, the features of the various embodiments can be combined with each other in various ways that are not specifically mentioned. Furthermore, the applicants reserve the right to claim the method of switching from two-stroke to four-stroke operation, which was explained using the example of the twin-piston engine, and/or the corresponding switchable valve operation by itself and not in association with the twin-piston engine. If the scavenging (exhaust) path is suitably arranged, other designs can also be operated using both working methods.

For ease of understanding the present description, a list of reference numbers utilized in the drawings is provided as follows:
2 Engine housing
4 Crankshaft
6, 8 Connecting rod
10, 12 Piston
14, 16 Individual cylinder
17 Double cylinder unit
18 Cylinder wall
19, 20 Cylinder space
21 Combustion chamber
22 Inlet channel
23 Cylinder head
24 Outlet channel
26 Inlet valve
28 Outlet valve
30 Spark plug
32 Crankpin
36 Bridge member
38 Lug
40 Pin
42 Groove
44 Disk cam
48 Lug
50 Recess
52 Injection valve
54 Slot
56 Upper piston ring
58 Lower piston ring
60 Cam shaft
62 Two-stroke cam
64 Four-stroke cam
66 Annular surface
70 Valve
72 Valve lever
74, 76 Arm
78 Bolt
80 Base portion
82 Interlocking pin
84 Contact surface
86 Inner lever
88 Arm
90 Cross-piece portion
92 Roller
94 Connecting plate
96 Contact lug
98 Outer spring
100 Outer lever
102 Arm
104 Cross-piece
106 Recess (through hole)
108 Contact surface
110 Connecting plate
112 Inner spring
114 Clearance compensating element
116 Connecting hole
118 Through hole
120 Sleeve
122 Dividing wall component
124 Transverse pin
126 Spring
128 Opening
130 Space
132 Recess

What is claimed is:

1. An internal combustion engine comprising:
a crank drive rotatably disposed within an engine housing,
at least one double cylinder unit defined within the engine housing, the double cylinder unit comprising at least two individual cylinders, wherein the two individual cylinders share a common cylinder wall that separates the two individual cylinders within the double cylinder unit,
a piston reciprocally movable within each individual cylinder, wherein each piston includes a piston head and the pistons are connected to the crank drive such the pistons reciprocate in the same direction within the individual cylinders,
a cylinder space defined within each individual cylinder on the side of the piston head that is opposite of the crank drive, wherein common combustion chamber is arranged in the double cylinder unit so as to continuously communicate with the cylinder spaces, and
at least one slot defined in the common cylinder wall, the at least one slot being arranged and constructed to permit communication between the cylinder spaces through the at least one slot at least when the pistons are located in their bottom dead center position, and the at least one slot being arranged and constructed to be blocked, such that the cylinder spaces do not communicate with each other through the at least one slot, at least when the pistons are located in their upper dead center position; and;
three inlet valves and three outlet valves disposed such that at least one inlet valve and at least one outlet valve opens into the common combustion chamber.

2. An internal combustion engine according to claim 1, wherein the crank drive is arranged and constructed such that the pistons are located at their top dead center position at the same time.

3. An internal combustion engine according to claim 2, wherein the crank drive comprises a crankshaft with a crank having first and second crank pin portions, each crank pin portion having a longitudinal axis, wherein one end of a connecting rod is connected to the piston and another end of the connecting rod is connected to one of the first and second crank pin portions, and wherein the longitudinal axes of the crank pin sections are offset with respect to each other such that the connecting rods reach their extended position at the same time.

4. An internal combustion engine according to claim 2, wherein the crank drive comprises a crankshaft having a crank pin, a bridge member is mounted on the crank pin, first and second connecting rods are mounted on opposite sides of the bridge member relative to the crank pin, a guide device retains the bridge member at least in the uppermost position of the crankpin relative to the movement paths of the such that the pistons are located in their dead center position at the same time.

5. An internal combustion engine according to claim 1, wherein the individual cylinders have respective longitudinal axes that are axially and radially offset with respect to each other relative to a rotational axis of the crank drive.

6. An internal combustion engine according to claim 1, wherein the individual cylinders have longitudinal axes that are parallel to each other.

7. An internal combustion engine according to claim 1, wherein the individual cylinders have longitudinal axes that are not parallel to each other.

8. An internal combustion engine according to claim 1, further comprising three inlet valves and three outlet valves disposed such that at least one inlet valve and at least one outlet valve opens into the common combustion chamber 9. An internal combustion engine comprising:
a crank drive rotatably disposed within an engine housing,
at least one double cylinder unit defined within the engine housing, the double cylinder unit comprising at least two individual cylinders, wherein the two individual cylinders share a common cylinder wall that separates the two individual cylinders within the double cylinder unit,
a piston reciprocally movable within each individual cylinder, wherein each piston includes a piston head and the pistons are connected to the crank drive such the pistons reciprocate in the same direction within the individual cylinders,
a cylinder space defined within each individual cylinder on the side of the piston head that is opposite of the crank drive, wherein a common combustion chamber is arranged in the double cylinder unit so as to continuously communicate with the cylinder spaces,
at least one slot defined in the common cylinder wall, the at least one slot being arranged and constructed to permit communication between the cylinder spaces through the at least one slot at least when the pistons are located in their bottom dead center position, and the at least one slot being arranged and constructed to be blocked, such that the cylinder spaces do not communicate with each other through the at least one slot, at least when the pistons are located in their upper dead center position; and
at least two piston rings disposed around each piston, wherein the distance between the piston rings is greater than the height of the at least one slot in the longitudinal direction of the cylinder.

10. An internal combustion engine according to claim 10, wherein the piston ring that is disposed closest to the crank drive provides a gas-tight and oil-permeable seal.

11. A method for operating an internal combustion engine comprising:
a crank drive rotatably disposed within an engine housing,
at least one double cylinder unit defined within the engine housing, the double cylinder unit comprising at least two individual cylinders, wherein the two individual cylinders share a common cylinder wall that separates the two individual cylinders within the double cylinder unit.
a piston reciprocally movable within each individual cylinder, wherein each piston includes a piston head and the pistons are connected to the crank drive such the pistons reciprocate in the same direction within the individual cylinders,
a cylinder space defined within each individual cylinder on the side of the piston head that is opposite of the crank drive, wherein a common combustion chamber is arranged in the double cylinder unit so as to continuously conmumicate with the cylinder spaces,
at least one slot defined in the conimon cylinder wall, the at least one slot being arranged and constructed to pernlit communication between the cylinder spaces through the at least one slot at least when the pistons are located in their bottom dead center position, and the at least one slot being arranged and constructed to be blocked, such that the cylinder spaces do not communicate with each other through the at least one slot, at least when the pistons are located in their upper dead. center position,
at least one inlet valve disposed above a first piston reciprocally disposed within a first individual cylinder of the at least one double cylinder unit, the at least one inlet valve being arranged and constructed to open and close an intake channel upstream of the at least one intake valve and wherein an inlet-side cylinder space is defined above the first piston,
at least one outlet valve disposed above a second piston reciprocally disposed in a second individual cylinder of the at least one double cylinder unit, the at least one outlet valve being arranged and constructed to open and close an exhaust channel downstream of the at least one outlet valve and wherein an outlet-side cylinder space is defined above the second piston and
a charging device arranged and constructed to supply a high pressure charge to the intake channel, the method comprising:
actuating the inlet and outlet valves such that the reciprocating internal combustion engine operates at least in one load and/or speed range according to a two-stroke operation with longitudinal scavenging from the inlet-side cylinder space to the outlet-side cylinder space.

12. A method according to claim 11, wherein the valves are actuated such that the internal combustion engine operates according to a four-stroke operation during at least one of engine idling and partial engine loading and operates according to the two-stroke operation during at least one other engine load range.

13. A method according to claim 12, further comprising opening the outlet valve before the pistons expose the at least one slot during a working stroke.

14. A method according to claim 12, wherein switching between the two- and four-stroke operation is effected by at least one cam of a camshaft, which is rotating at half the crankshaft speed, being switched such that said at least one cam is inactive during four-stroke operation.

15. An apparatus for adjusting a valve stroke function of at least one valve of an internal combustion engine, comprising:

a camshaft having a first cam and a second cam, a valve lever pivotally mounted on a mechanically fixed component and being supported on the stem of a valve, wherein the valve lever comprises an interlocking mechanism, a first follower lever pivotally attached to the valve lever and being arranged and constructed to follow the first cam, a second follower lever pivotally attached to the valve lever and being arranged and constructed to follow the second cam, and the interlocking mechanism is arranged and constructed to selectively rigidly connect only one of the first follower lever and the second follower lever to the valve lever at a time, wherein when the first follower lever is interlocked with the valve lever, the valve is actuated in accordance with the first cam and, when the second follower lever is interlocked with the valve lever, the valve is actuated in accordance with the second cam.

16. An apparatus according to claim 15, wherein the valve lever is mounted on a mechanically fixed, hydraulic clearance-compensating element.

17. An apparatus according to claim 15, wherein an annular surface is defined on the camshaft between the first cam and the second cam and a contact surface of the valve lever is arranged and constructed to rest on the annular surface when the first and second follower levers are unlocked.

18. An apparatus according to claim 15, wherein the cam shaft comprises at least two second cams and two annular surfaces defined between the first cam and the respective second cams, the valve lever comprises two arms having respective contact surfaces arranged and constructed to rest on the respective annular surface, the arms project from a base portion that is arranged and constructed to rest on a stem of the valve, and the base portion supports the interlocking mechanism, wherein the first follower lever is defined as an inner lever that is pivotally attached at a distance from the base portion between the arms of the valve lever and having a follower member arranged and constructed to follow the first cam, a recess is defined in the first follower lever and is adapted to engage an interlocking element of the interlocking mechanism and the second follower lever is formed as a generally U-shaped outer lever, which U-shaped lever is pivotally attached at a distance from the base portion, wherein the arms and the base portion of the valve lever are accommodated within the U-shaped lever, the arms comprise contact elements arranged and constructed to follow the second cam, a cross-piece connects the arms and has a recess adapted to engage the interlocking element of the interlocking mechanism.

19. An apparatus according to claim 15, wherein the first follower lever, in its unlocked state, is arranged and constructed to be urged in spring contact against the first cam and the second follower lever, in its unlocked state, is arranged and constructed to be urged in spring contact against the second cam.

20. An apparatus according to claim 15, wherein one of the first and second cams is arranged and constructed to operate the internal combustion engine in a two-stroke mode and one of the first and second cams is arranged and constructed to operate the internal combustion engine in a four-stroke mode.

* * * * *